(12) United States Patent  (10) Patent No.: US 8,894,243 B2
Cho et al.  (45) Date of Patent: Nov. 25, 2014

(54) ORGANIC LIGHT EMITTING DISPLAY HAVING IMPROVED COLOR SHIFT AND VISIBILITY

(71) Applicant: Samsung Corning Precision Materials Co., Ltd., Gyeongsangbuk-do (KR)

(72) Inventors: Eun Young Cho, ChungCheongNam-Do (KR); Eui Soo Kim, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 90 days.

(21) Appl. No.: 13/788,114

(22) Filed: Mar. 7, 2013

(65) Prior Publication Data

US 2014/0254147 A1 Sep. 11, 2014

(51) Int. Cl.
*F21V 9/00* (2006.01)
*G02B 5/22* (2006.01)

(52) U.S. Cl.
CPC .... *G02B 5/22* (2013.01); *F21V 9/00* (2013.01)
USPC ........... 362/293; 362/618; 362/620; 362/624; 362/625; 362/626

(58) Field of Classification Search
USPC ................ 362/293, 618, 620, 624, 625, 626; 428/1.1
See application file for complete search history.

(56) References Cited

U.S. PATENT DOCUMENTS

| 7,480,097 | B2 * | 1/2009 | Nagahama et al. | ........... 359/449 |
| 7,980,716 | B2 * | 7/2011 | Hirata et al. | ................ 362/97.1 |
| 2006/0040204 | A1 * | 2/2006 | Nagahama et al. | ........ 430/270.1 |
| 2009/0033832 | A1 * | 2/2009 | Pai | ................................ 349/65 |

* cited by examiner

*Primary Examiner* — Ali Alavi
(74) *Attorney, Agent, or Firm* — Lerner, David, Littenberg, Krumholz & Mentlik, LLP

(57) ABSTRACT

An optical filter which minimizes color shift, increases brightness and improves visibility and an organic light-emitting display having the same. The optical filter includes a micro pattern film disposed on an organic light-emitting panel. The micro pattern film includes a base material and a micro pattern engraved from the surface of the base material that adjoins the organic light-emitting panel. The micro pattern has a plurality of engraved shapes with a non-circular cross-section which has a depth greater than a width.

19 Claims, 4 Drawing Sheets

ORGANIC LIGHT EMITTING DISPLAY HAVING IMPROVED COLOR SHIFT AND VISIBILITY

BACKGROUND OF THE INVENTION

1. Field of the Invention

The present invention relates to an organic light-emitting display, and more particularly, to an organic light-emitting display which minimizes color shift, increases brightness and improves visibility.

2. Description of Related Art

In general, an organic light-emitting diode (OLED) includes an anode, an organic light-emitting layer and a cathode. When a voltage is applied between the anode and the cathode, holes are injected from the anode into the organic light-emitting layer, and electrons are injected from the cathode into the organic light-emitting layer. Holes and electrons that are injected into the organic light-emitting layer recombine with each other in the organic light-emitting layer, thereby generating excitons. When such excitons transit from the excited state to the ground state, light is emitted.

Organic light-emitting displays including an OLED are divided into a passive matrix type and an active matrix type depending on a mechanism that drives an N×M number of pixels which are arranged in the shape of a matrix.

In the active matrix type, a pixel electrode which defines a light-emitting area and a unit pixel driving circuit which applies a current or voltage to the pixel electrode are positioned in a unit pixel area. The unit pixel driving circuit has at least one thin-film transistor (TFT). Due to the TFT, the unit pixel driving circuit can supply a constant current irrespective of the number of pixels, thereby realizing uniform brightness. The active matrix type organic light-emitting display consumes little power, and thus can be advantageously applied to high definition displays and large displays.

However, the organic light-emitting display has a low outcoupling efficiency, which is problematic. For example, in the case of an organic light-emitting display which has not undergone separate processing, about 20% of light emitted from the organic light-emitting layer exits the display.

Here, the light efficiency of the organic light-emitting display is determined by the refractive indices of individual component layers of the organic light-emitting display, including the organic light-emitting layer to the outer portion thereof. One of the factors that reduce the light efficiency is that a portion of light travels in an unnecessary direction when exiting from a substrate having a higher refractive index to the air having a lower refractive index and, when incident on the interface between the substrate and the air at an angle greater than a critical angle, totally reflects from the interface, thereby reducing the amount of light that exits to the outside.

In order to overcome the light efficiency problem of the organic light-emitting display, a micro cavity structure was proposed. In the micro cavity structure, the distance between the anode and the cathode is designed to match the representative wavelength of each of red (R), green (G) and blue (B) light such that only the light corresponding to the distance resonates and exits but the other light is weakened. Consequently, the exiting light is increased in intensity and becomes sharper, so that its brightness is advantageously increased. The increased brightness results in low power consumption, which leads to increased longevity. Here, the fact that the emitting light becomes sharper indicates that color reproducibility is increased with improved color purity.

Although the organic light-emitting display having the micro cavity structure exhibits the foregoing advantages, it also has the drawback of a limited color viewing angle that is caused by color shift. This is because the optical path is changed at a side, or a high angle, thereby varying the wavelength of light that can resonate. Therefore, since the optical path is increased at the side, the light that resonates and exits is more shifted toward a short wavelength, which is problematic.

Furthermore, since the organic light-emitting display uses the OLED that is a self-luminous light source, the anode is made of a high-reflectivity material in order to effectively send emitted light only toward the front. Consequently, in external light conditions, the visibility of the organic light-emitting display is decreased due to very high reflectivity.

The information disclosed in the Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an organic light-emitting display which minimizes color shift, increases brightness and improves visibility.

In an aspect of the present invention, provided is an optical filter for an organic light-emitting display that includes a micro pattern film disposed on an organic light-emitting panel. The micro pattern film includes a base material; and a micro pattern engraved from the surface of the base material that adjoins the organic light-emitting panel. The micro pattern has a plurality of engraved shapes with a non-circular cross-section which has a depth greater than a width.

According to an exemplary embodiment of the present invention, the micro pattern film may be isotropic with respect to an optical axis.

The plurality of engraved shapes may be repeatedly formed at predetermined intervals in one direction in the surface of the base material that adjoins the organic light-emitting panel.

Each engraved shape may have a semi-oval cross-section.

The plurality of engraved shapes may be filled with air or resin.

Here, the refractive index difference between the resin and the base material may range from 0.1 to 0.3.

The base material may have a light-absorbing material dispersed therein.

Here, the light-absorbing material may be a black pigment including carbon black.

The optical filter may further include a circular polarizer film disposed on the micro pattern film.

In addition, the micro pattern film may be disposed between the circular polarizer film and the organic light-emitting panel.

Here, the circular polarizer film may include a polarizer film and a λ/4 phase difference film which are stacked on each other.

The optical filter may further include a circular polarizer film comprising a polarizer film and a λ/4 phase difference film which are stacked on each other. The micro pattern film is formed on at least one surface of the opposite main surfaces of the λ/4 phase difference film.

The polarizer film may include a triacetyl cellulose (TAC) film and a polyvinyl acetate (PVA) film which are stacked on each other.

Here, the base material may be made of triacetyl cellulose (TAC) or polyvinyl acetate (PC).

The micro pattern film may be directly attached to the organic light-emitting panel.

The micro pattern film may be attached to the organic light-emitting panel via an adhesive.

In another aspect of the present invention, provided is an organic light-emitting display that includes an organic light-emitting panel including organic light-emitting devices which emit red, green, blue or white light, the organic light-emitting devices having different heights from each other depending on wavelengths of emitted light; and an optical filter including a micro pattern film disposed on the organic light-emitting panel, the micro pattern film comprising a micro pattern engraved from a surface of a base material that adjoins the organic light-emitting panel, the micro pattern having a plurality of engraved shapes which have a depth greater than a width.

Here, the base material may have a light-absorbing material dispersed therein.

The optical filter may further include a circular polarizer film disposed on the micro pattern film.

According to embodiments of the present invention, due to the micro pattern film disposed on the organic light-emitting panel, it is possible to minimize color shift by mixing light from the side with light from the front with little decrease in the amount of light extraction in the central direction.

In addition, due to the micro pattern film in which the light-absorbing material is dispersed or the circular polarizer film disposed on the micro pattern film, it is possible not only to reduce color shift, but also to increase bright-room contrast ratio (BRCR) and visibility by decreasing reflectivity by blocking external light.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
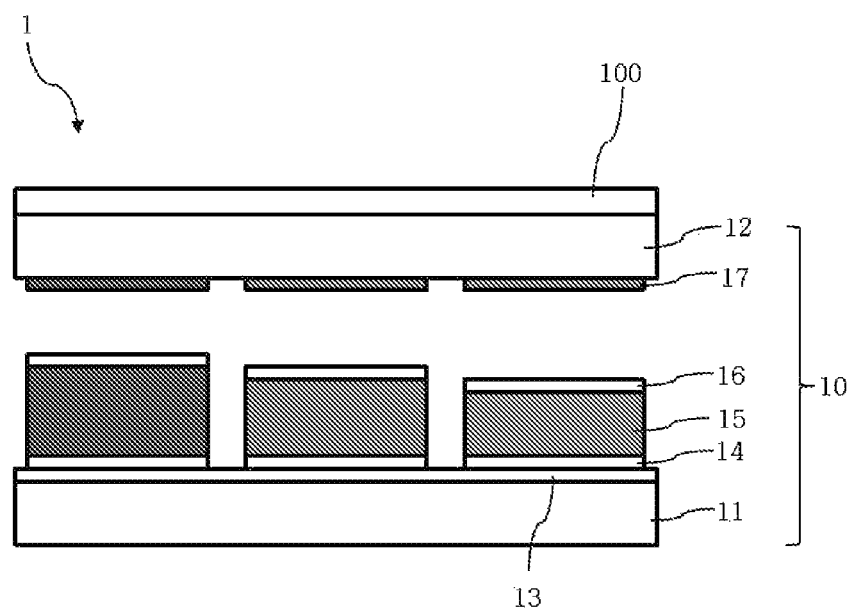
FIG. 1 is a cross-sectional configuration view schematically showing an organic light-emitting display having an optical filter according to an embodiment of the present invention.

Reference will now be made in detail to an optical filter and an organic light-emitting display having the same according to the present invention, various embodiments of which are illustrated in the accompanying drawings and described below.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

As shown in FIG. 1, an optical filter 100 according to an embodiment of the present invention is disposed on a front surface of an organic light-emitting panel 10 of an organic light-emitting display 1, i.e. on one surface of the organic light-emitting panel 10 that is in the direction along which light emitted from an organic light-emitting device exits. Thus, the organic light-emitting display 1 according to an embodiment of the present invention includes the optical filter 100 and the organic light-emitting panel 10.

The organic light-emitting panel 10 is configured as a micro cavity structure in order to improve light efficiency. Specifically, the organic light-emitting panel 10 having the micro cavity structure includes a plurality of organic light-emitting devices each of which generates red, green, blue or white light. As shown in FIG. 1, each unit pixel of the organic light-emitting panel 10 consists of organic light-emitting devices which generate red, green and blue light. The organic light-emitting device which generates red light, i.e. long wavelength light, has the greatest distance between an anode 14 and a cathode 16, whereas the organic light-emitting device which generates blue light, i.e. shaft wavelength light, has the shortest distance between an anode 14 and a cathode 16. This means, in the organic light-emitting panel 10, that the distance between the corresponding anode and cathode 14 and 16 of, for example, the red organic light-emitting device is set to match the representative wavelength of red light so that only light that corresponds to the distance can resonate and exit but other light is weakened. The same principle and configuration are applied to the green and blue organic light-emitting devices.

Figure 2:
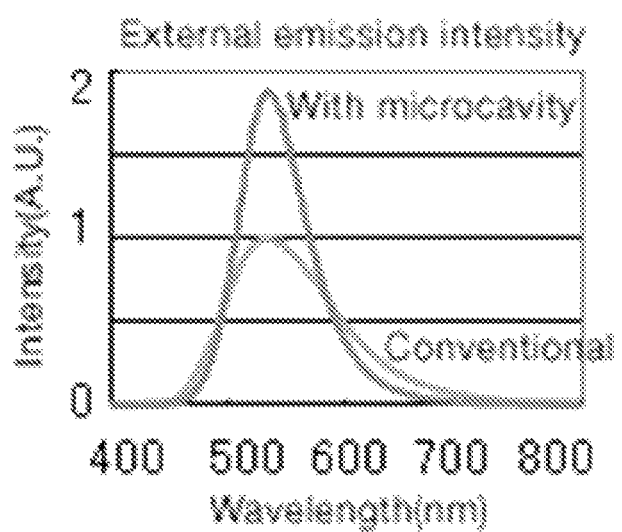
FIG. 2 is a graph showing variations in the intensity of light emission depending on wavelengths in an organic light-emitting display of the related art and an organic light-emitting display having a micro cavity structure according to an embodiment of the present invention.

When the organic light-emitting panel 10 having the micro cavity structure is provided as above, as shown in the graph of FIG. 2, the intensity of light increases more than the conventional case and the profile of light becomes sharper than the conventional case. This means that overall brightness and color reproducibility are increased.

Describing the structure of the organic light-emitting panel 10, the unit pixel of the organic light-emitting panel 10 includes a gate line, a data line which perpendicularly intersects the gate line, a switching thin-film transistor (TFT) which is connected to the gate line and the data line, a driving TFT which is connected to the organic light-emitting device between the switching TFT and a power line, and a storage capacitor which is connected between a gate electrode of the drive TFT and the power line.

In response to a scan signal from the gate line, the switching TFT supplies a data signal from the data line to the gate electrode of the driving TFT and the storage capacitor. In response to the data signal from the switching TFT, the driving TFT controls the brightness of the organic light-emitting device by adjusting a current supplied from the power line to the organic light-emitting device. In addition, the storage capacity charges the data signal from the switching TFT and supplies a charged voltage to the driving TFT so that the driving TFT can supply a predetermined current when the switching TFT is turned off.

In addition, the organic light-emitting panel 10 can be configured as an active matrix type that is appropriate to display a dynamic image since three color (red, green and blue) sub-pixels of the unit pixel are independently driven. Consequently, each sub-pixel of the organic light-emitting panel includes an organic light-emitting device and a driving circuit portion 13. The organic light-emitting device of each sub-pixel is disposed between first and second substrates 11 and 12 which face each other, and includes an anode 14, an organic light-emitting layer 15 and a cathode 16. The driving circuit portion 13 is formed on the first substrate 11, and is electrically connected to the anode 14 and the cathode 16.

The anode 14 can be made of an opaque metal such as aluminum (Al), and the cathode 16 can be formed as a transparent oxide electrode, such as indium tin oxide (ITO), or a semitransparent electrode of a nickel (Ni) thin film so that light generated from the organic light-emitting layer 15 can easily pass through the cathode 16.

In addition, the driving circuit portion 13 can include at least two TFTs and a capacitor as described above, and controls the brightness of the organic light-emitting device by adjusting the amount of a current supplied to the organic light-emitting device in response to a data signal.

In addition, the organic light-emitting layer 15 of the organic light-emitting device includes a hole injection layer, a hole carrier layer, a light-emitting layer, an electron carrier layer and an electron injection layer which are sequentially layered on the anode 14. According to this structure, when a forward voltage is applied between the anode 14 and the cathode 16, electrons migrate from the cathode 16 to the light-emitting layer through the electron injection layer and the electron carrier layer. The electrons and holes that are injected into the light-emitting layer recombine with each other in the organic light-emitting layer, thereby generating excitons. When such excitons transit from the excited state to the ground state, light is emitted. The brightness of emission light is proportional to the amount of the current flowing between the anode 14 and the cathode 16.

In addition, the organic light-emitting panel 10 has a color filter 17 in order to improve color efficiency. The color filter 17 is formed on the second substrate 12. Specifically, a red color filter is formed on a red sub-pixel area, a green color filter is formed on a green sub-pixel area, and a blue color filter is formed on a blue sub-pixel area. When the unit pixel includes four color (red, green, blue and white) sub-pixel areas, the color filter can be omitted from the white sub-pixel areas.

Furthermore, although not shown, a black matrix which prevents light leakage and color mixing can be formed on the second substrate 12, particularly, on interfaces between individual sub-pixels. In addition, a spacer which electrically connects the anode 14 and the cathode 16 to each other and the anode 14 and the driving circuit portion 13 to each other can be formed. The electrical connection can be realized through face-to-face bonding by a sealing material of the first substrate 11 and a sealing material of the second substrate 12.

In addition, as described above, the organic light-emitting display 1 according to this embodiment has a front emission structure, which can prevent light from being blocked by the TFTs during back emission, thereby realizing higher light efficiency.

Figure 3:
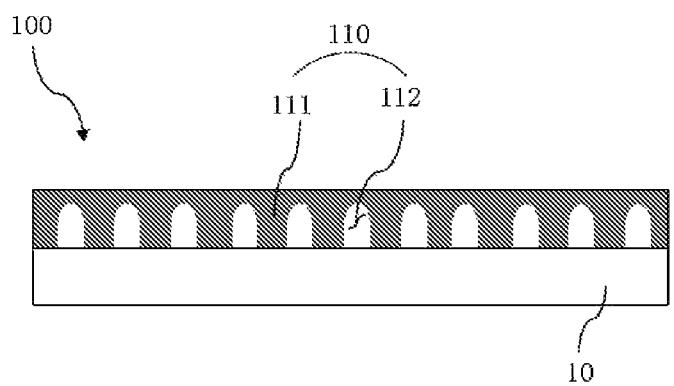
FIG. 3 is a cross-sectional view schematically showing an optical filter according to an embodiment of the present invention.

As shown in FIG. 3, the optical filter 100 according to an embodiment of the present invention accts to minimize the problem of the reduced color viewing angle, which is caused by the color shift of the organic light-emitting panel 10 which has the micro cavity structure in order to improve light efficiency. For this, the optical filter 100 is disposed on the organic light-emitting panel 10. The optical filter 100 includes a micro pattern film 110.

The micro pattern film 110 is a film that is isotropic with respect to an optical axis, and includes a base material 111 and a micro pattern 112. Here, the micro pattern 112 is formed in one surface of the base material 111. In order to minimize image blurring, the micro pattern 112 is disposed so as to face the organic light-emitting panel 10 when the micro pattern film 110 is disposed on the organic light-emitting panel 10. That is, the micro pattern 112 is formed in the contact surface of the base material 111 that adjoins the organic light-emitting panel 10.

The micro pattern 112 is engraved from the contact surface of base material 111. The micro pattern 112 includes engraved portions each having a non-circular cross-section. It is preferred that the non-circular cross-section have a semi-oval shape. When each of the engraved portions of the micro pattern 112 is formed such that it has the semi-oval cross section, the possibility that double images will occur is reduced. The engraved portion of the micro pattern 112 has a high aspect ratio, with the depth being greater than the width. In order to prevent moiré, the width of the engraved portion of the micro pattern 112 is required to be sufficiently narrow considering the relationship of the organic light-emitting panel 10 to the pixel area. In addition, the engraved portions of the micro pattern 112 can be repeatedly formed at predetermined intervals in one direction in the contact surface of the base material 111. That is, the micro pattern 112 formed in the contact surface of the base material 111 can include a plurality of engraved portions. The micro pattern 112 can be a pattern selected from among, but not limited to, stripes, waves, a matrix, a honeycomb and dots.

Since the micro pattern 112 is formed of the engraved portions each having the non-circular cross-section with the depth being greater than the width, it blocks side light which would otherwise cause color shift and diffuses front light in the direction toward sides due to the curved shape of the top of the engraved portion (on the paper surface), thereby minimizing the color shift. Here, the micro pattern 112 increases the overall brightness by acting to redirect sideward light in the direction toward the front without greatly reducing the amount of light extraction in the linear direction. In addition, the inside of the engraved portions of the micro pattern 112 can be filled with air or a resin having a predetermined value of refractive index. In this case, it is preferred that the resin of the micro pattern 112 have a refractive index difference ranging from 0.1 to 0.3 from the base material 111. Here, a lens effect realized by the micro pattern 112 varies depending on the refractive index of the resin of the micro pattern 112 and the refractive index of the base material 111 in which the micro pattern 112 is formed.

According to this embodiment of the present invention, a light-absorbing material can be dispersed in the base material 111. The light-absorbing material acts to shield the micro pattern film 110 from external light. Consequently, the optical filter 100 according to this embodiment can minimize the color shift of the organic light-emitting display 1 and increase the brightness of the organic light-emitting display 1 due to the micro pattern 112, while increasing the bright-room contrast ratio (BRCR) and visibility of the organic light-emitting display 1 due to the light-absorbing material.

Specifically, the micro pattern film 110 in which the light-absorbing material is dispersed can prevent external light from entering the organic light-emitting panel 10 by absorbing the external light, while realizing high BRCR by allowing light generated by the organic light-emitting panel 10 to efficiently pass through it, thereby increasing visibility. Here, the light-absorbing material can be implemented as a black organic or inorganic pigment or the like which can absorb light. Typically, the light-absorbing material can be carbon black. When the light-absorbing material is implemented with black organic or inorganic pigment including carbon black, it is also possible to reduce the cost of manufacture.

Furthermore, the micro pattern film 110 can be directly attached to the organic light-emitting panel 10 in order to reduce image blurring. In addition, the micro pattern film 110 can be attached to the organic light-emitting panel 10 via a pressure sensitive adhesive (PSA, not shown) or by an adhesive.

A description will be given below of optical filters according to other embodiments of the present invention with reference to FIG. 4 to FIG. 6.

Figure 4:
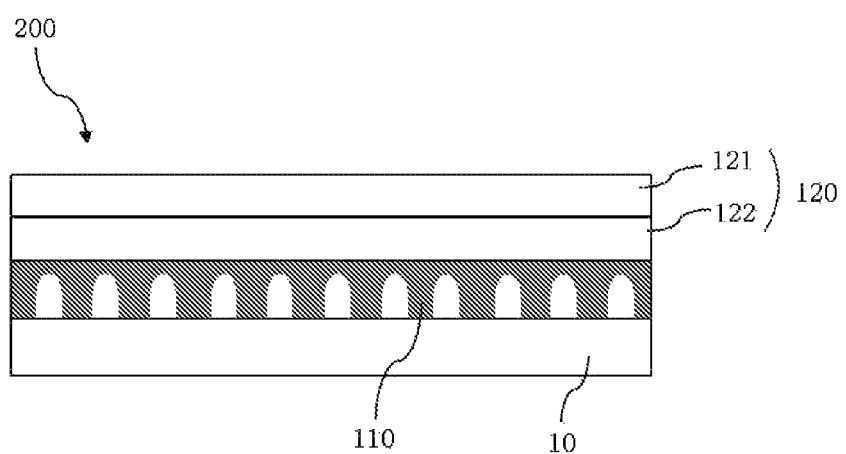
FIG. 4 is a cross-sectional view schematically showing a first structure of an optical filter according to another embodiment of the present invention.
Figure 5:
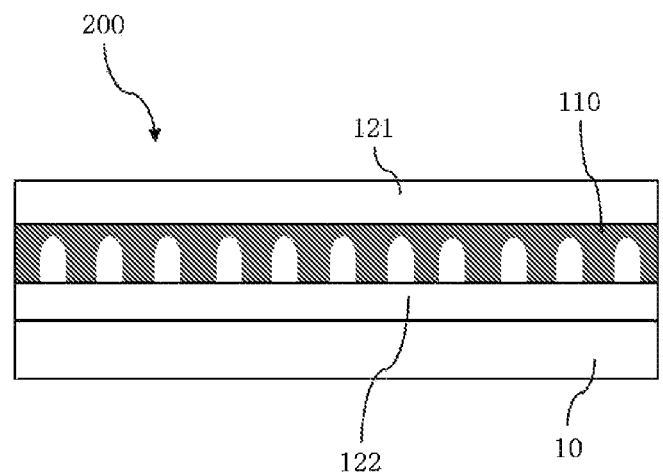
FIG. 5 is a cross-sectional view schematically showing a second structure of an optical filter according to another embodiment of the present invention.
Figure 6:
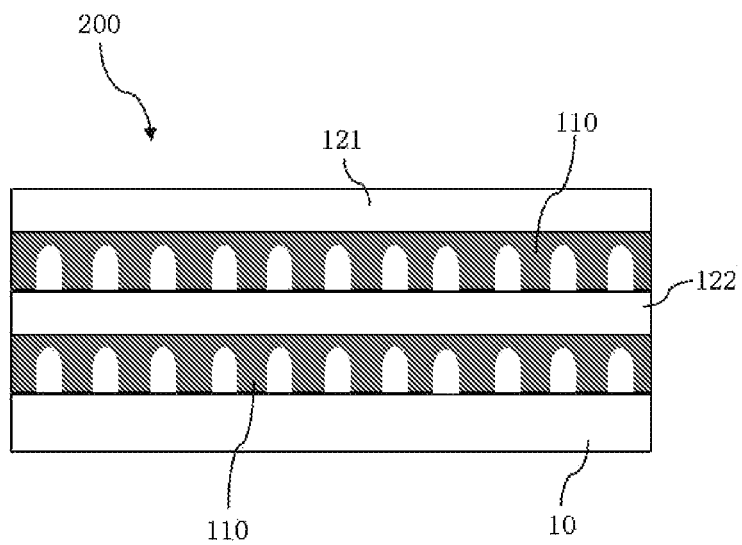
FIG. 6 is a cross-sectional view schematically showing a third structure of an optical filter according to another embodiment of the present invention.

FIG. 4 is a cross-sectional view schematically showing a first structure of an optical filter according to another embodiment of the present invention, FIG. 5 is a cross-sectional view schematically showing a second structure of an optical filter according to another embodiment of the present invention, and FIG. 6 is a cross-sectional view schematically showing a third structure of an optical filter according to another embodiment of the present invention.

As shown in FIG. 4 to FIG. 6, an optical filter 200 according to this embodiment of the present invention includes a micro pattern film 110 and a circular polarizer film 120.

This embodiment of the present invention is substantially the same as the former embodiment of the present invention, except that the circular polarizer film 120 which has the same function as the light-absorbing material for the micro pattern film is added and thus the light-absorbing material is omitted. Therefore, the same reference numerals are used to designate to the other components and descriptions thereof are omitted.

The circular polarizer film 120 includes a polarizer film 121 and a λ/4 phase difference film 122 which are stacked on each other. The polarizer film 121 includes a triacetyl cellulose (TAC) film and a polyvinyl alcohol (PVA) film. In an example, polarizer film 121 can have a stacked structure of a TAC film, a PVA film and TAC film. However, the polarizer film 121 can have various other structures. Here, the PVA film is a film that acts to polarize light, and can be formed by allowing a dichroic colorant to be adsorbed by a polymer material, polyvinyl alcohol (PVA). In addition, the TAC films disposed on the opposite surfaces of the PVA film act to support the PVA film.

As shown in FIG. 4, the circular polarizer film 120 can be disposed on the micro pattern film 110. Since the micro pattern film 110 is disposed between the organic light-emitting panel 10 and the circular polarizer film 120, when the base material 111 of the micro pattern film 110 is made of an anisotropic material, the optical axis of which is not coaxial with the optical axis of the circular polarizer film 120, polarization may be disabled and incident external light may exit to the outside again. Consequently, the amount of light reflected by the organic light-emitting panel 10 may significantly increase, thereby decreasing visibility. Therefore, the base material 111 of the micro pattern film 110 must be made of an isotropic material, such as triacetyl cellulose (TAC) or solvent cast polycarbonate (PC), the optical axis of which is coaxial with the optical axis of the circular polarizer film 120.

In the state in which the circular polarizer film 120 is disposed on the micro pattern film 110 according to this embodiment, when nonpolarized external light enters, the external light is converted into linear polarized light by the PVA film of the polarizer film 121 and is then converted into circular polarized light by the λ/4 phase difference film. The circular polarized light is reflected from the interface between the λ/4 phase difference film 122 and the micro pattern film 110 or the interface between the micro pattern film 110 and the organic light-emitting panel 10, thereby being converted into circular polarized light that has the opposite direction of spin. In addition, the circular polarized light is converted into linear polarized light which is perpendicular to the transmission axis of the PVA film while passing through the λ/4 phase difference film 122, and exits to the outside.

In addition, as shown in FIG. 5 and FIG. 6, according to the other structures of this embodiment, the micro pattern film 110 can be disposed between the polarizer film 121 and the λ/4 phase difference film 122, or the micro pattern films 110 can be formed on the opposite surfaces of the λ/4 phase difference film 122.

When the circular polarizer film 120 is added on the micro pattern film 110 according to this embodiment unlike the former embodiment in which the light-absorbing material is used, it is possible to maintain low reflectivity since incident external light cannot exit to the outside again. Consequently, the optical filter can exhibit high BRCR and visibility. Here, the effect of reducing and maintaining reflectivity can be better than that of the former embodiment.

Figure 7:
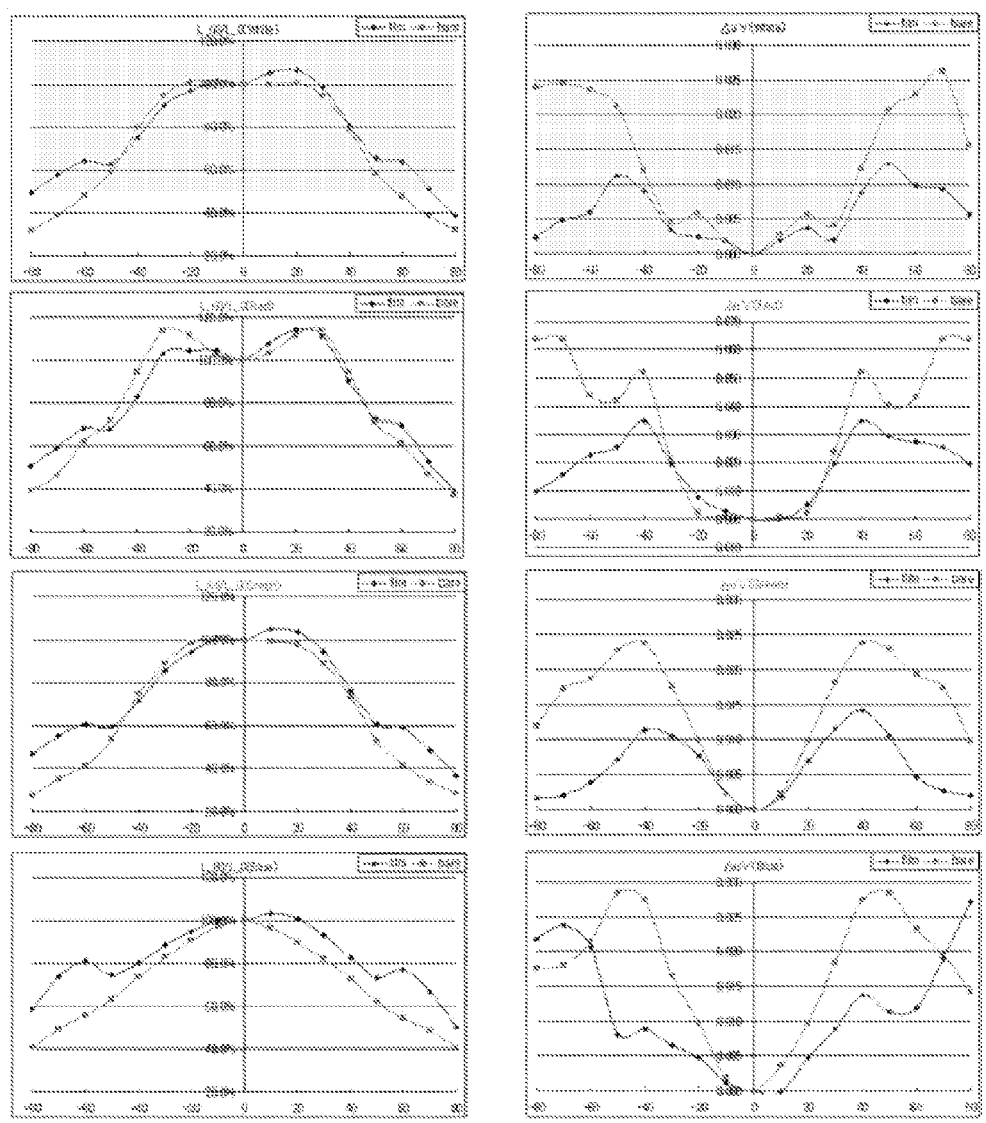
FIG. 7 is graphs showing color shifts and horizontal brightness profiles depending on viewing angles in an organic light-emitting display of the related art and an organic light-emitting display according to an embodiment of the present invention, the color shifts and the horizontal brightness profiles being presented according to luminous color.

FIG. 7 is graphs showing color shifts and horizontal brightness profiles depending on viewing angles in an organic light-emitting display of the related art and an organic light-emitting display according to an embodiment of the present invention, in which the color shifts and the horizontal brightness profiles are presented according to luminous color.

As shown in the graphs in FIG. 7, it can be appreciated that color shifts are generally reduced in all of the colors, including red, green, blue and white, and brightness is also increased more or less.

As set forth above, the optical filter 100, 200 and the organic light-emitting display 1 having the same according to the present invention can guide sideward light in the direction toward the center with little decrease in the amount of light extraction in the central direction due to the micro pattern film 110 disposed on the organic light-emitting panel 10, thereby minimizing color shift while increasing overall brightness. In addition, due to the micro pattern film 110 in which the light-absorbing material is dispersed or the circular polarizer film 120 disposed on the micro pattern film, it is possible not only to reduce color shift, but also to increase bright-room contrast ratio (BRCR) and visibility by decreasing reflectivity by blocking external light.

The foregoing descriptions of specific exemplary embodiments of the present invention have been presented with respect to the certain embodiments and drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. An optical filter for an organic light-emitting display, comprising a micro pattern film disposed on an organic light-emitting panel, wherein the micro pattern film comprises:
   a base material; and
   a micro pattern engraved from a surface of the base material that adjoins the organic light-emitting panel, the micro pattern having a plurality of engraved shapes with a non-circular cross-section which has a depth greater than a width.

2. The optical filter of claim 1, wherein the micro pattern film is isotropic with respect to an optical axis.

3. The optical filter of claim 1, wherein the plurality of engraved shapes are repeatedly formed at predetermined intervals in one direction in the surface of the base material that adjoins the organic light-emitting panel.

4. The optical filter of claim 1, wherein each engraved shape has a semi-oval cross-section.

5. The optical filter of claim 1, wherein the plurality of engraved shapes are filled with air or resin.

6. The optical filter of claim 5, wherein a refractive index difference between the resin and the base material ranges from 0.1 to 0.3.

7. The optical filter of claim 1, wherein the base material comprises a light-absorbing material dispersed therein.

8. The optical filter of claim 7, wherein the light-absorbing material comprises a black pigment including carbon black.

9. The optical filter of claim 1, further comprising a circular polarizer film disposed on the micro pattern film.

10. The optical filter of claim 9, wherein the micro pattern film is disposed between the circular polarizer film and the organic light-emitting panel.

11. The optical filter of claim 9, wherein the circular polarizer film comprises a polarizer film and a $\lambda/4$ phase difference film which are stacked on each other.

12. The optical filter of claim 1, further comprising a circular polarizer film comprising a polarizer film and a $\lambda/4$ phase difference film which are stacked on each other,
   wherein the micro pattern film is formed on at least one surface of the opposite main surfaces of the $\lambda/4$ phase difference film.

13. The optical filter of claim 11 or 12, wherein the polarizer film comprises a triacetyl cellulose film and a polyvinyl acetate film which are stacked on each other.

14. The optical filter of claim 13, wherein the base material comprises triacetyl cellulose or polyvinyl acetate.

15. The optical filter of claim 1, wherein the micro pattern film is directly attached to the organic light-emitting panel.

16. The optical filter of claim 1, wherein the micro pattern film is attached to the organic light-emitting panel via an adhesive.

17. An organic light-emitting display comprising:
   an organic light-emitting panel comprising organic light-emitting devices which emit red, green, blue or white light, the organic light-emitting devices having different heights from each other depending on wavelengths of emitted light; and
   an optical filter comprising a micro pattern film disposed on the organic light-emitting panel, the micro pattern film comprising a micro pattern engraved from a surface of a base material that adjoins the organic light-emitting panel, the micro pattern having a plurality of engraved shapes which have a depth greater than a width.

18. The organic light-emitting display of claim 17, wherein the base material comprises a light-absorbing material dispersed therein.

19. The organic light-emitting display of claim 17, wherein the optical filter further comprises a circular polarizer film disposed on the micro pattern film.

* * * * *